United States Patent [19]

Fujii et al.

[11] Patent Number: 5,298,559

[45] Date of Patent: Mar. 29, 1994

[54] MULTI-LAYERED POLYMERS

[75] Inventors: Tatsuo Fujii, Nagaokakyo; Shinji Tachibana, Nishinomiya; Junji Oshima, Toyonaka; Goro Shimaoka; Kazuhiko Ishii, both of Hiratsuka; Makoto Mizutani, Kamisu, all of Japan

[73] Assignees: Mitsubishi Gas Chemical Company, Inc., Tokyo; Takeda Chemical Industries, Ltd., Osaka, both of Japan

[21] Appl. No.: 985,214

[22] Filed: Dec. 3, 1992

[30] Foreign Application Priority Data

Dec. 5, 1991 [JP] Japan ................... 3-321914

[51] Int. Cl.$^5$ ............... C08L 69/00; C08L 67/02; C08L 51/04
[52] U.S. Cl. ............................... 525/67; 525/64; 525/316; 525/902; 524/504
[58] Field of Search ............ 525/64, 67, 316, 902; 524/504

[56] References Cited

U.S. PATENT DOCUMENTS

| | | | |
|---|---|---|---|
| 3,661,994 | 5/1972 | Hwa | 525/902 |
| 3,864,428 | 2/1975 | Nakamura et al. | 260/873 |
| 3,971,835 | 7/1976 | Myers | 525/81 |
| 4,173,600 | 11/1979 | Kishida et al. | 525/76 |
| 4,393,169 | 7/1983 | Moriwaki et al. | 525/67 |
| 4,617,329 | 10/1986 | Weese et al. | 523/201 |
| 4,963,618 | 10/1990 | Sasaki et al. | 525/67 |
| 4,966,942 | 10/1990 | Sasaki et al. | 525/67 |
| 5,006,592 | 4/1991 | Oshima et al. | 524/504 |
| 5,183,859 | 2/1993 | Sasaki et al. | 525/309 |

FOREIGN PATENT DOCUMENTS 0465792 1/1992 European Pat. Off. .

OTHER PUBLICATIONS

Derwent Abstract of J53018661.

*Primary Examiner*—David Buttner
*Attorney, Agent, or Firm*—Wenderoth, Lind & Ponack

[57] ABSTRACT

A multi-layered polymer having (a) a core layer of an aromatic vinyl polymer, (b) an intermediate layer of a butadienic rubbery polymer and (c) an outer layer of an aromatic vinyl glassy polymer, the amount of the components (a), (b) and (c) being 12 to 42 weight %, 48 to 78 weight % and 10 to 40 weight %, respectively, provides a thermoplastic resin composition excellent not only in impact strength, especially in impact strength at low temperatures, but also in, in the case of containing a coloring agent, color-stability including less mottlings, and giving a molded article improved in preventing occurrence of delamination around the gate region.

12 Claims, No Drawings

MULTI-LAYERED POLYMERS

FIELD OF THE INVENTION

This invention relates to a multi-layered polymer, a thermoplastic resin composition containing the polymer and a molded article prepared therefrom. More specifically, the present invention relates to a multi-layered polymer, which is useful as an impact modifier for a thermoplastic resin containing polycarbonate resin and-/or polyester resin, to a thermoplastic resin composition comprising the multi-layered polymer, which is improved in impact strength, especially at low temperatures, and to a molded article prepared from the thermoplastic resin composition, and further relates to, in the preparation of a molded article colored with a coloring agent, a thermoplastic resin composition providing a molded article improved in color un-uniformity or delamination in the gate area, and to the molded article.

BACKGROUND OF THE INVENTION

While polycarbonate resin is tough and excellent in impact strength or electrical properties and also in dimensional stability, it has such drawbacks as high melting viscosity, poor moldability, thickness dependency observed in impact strength, poor chemical resistance as exemplified by occurrence of cracks when contacted with an aromatic solvent or gasoline. For example, at 23° C., when the thickness exceeds ¼ inch, brittle fracture is caused, and, even in a test piece of ⅛ inch thickness, impact strength tends to lower as temperatures go down. Thus, polycarbonate resin is inevitably limited in the field of its application.

For overcoming these drawbacks, a variety of improvements have been proposed. For example, in JPA S56(1981)-45946 and JPA S56(1981)-45947, an improvement in the impact strength of aromatic polycarbonate resin is seen by incorporating an acrylic impact modifier thereinto. According to this method, the impact strength is indeed improved, but, in colored molded articles, non-uniformity of color appearance which is, so called, color shading or pearlessence is caused. This phenomenon is especially remarkable at the site where the resin composition receives a high shear rate as in the gate region in the process of molding. Therefore, uses of such colored molded articles as above are inevitably restricted without applying further treatments such as surface painting. And, as mentioned above, at the site where the resin composition receives a high shear rate in the process of molding, delamination is often observed, leading, in some instances, to molded articles which can hardly be put to practical uses. In JPA S56(1981)-28234, there is disclosed a thermoplastic resin composition from which a molded article excellent in impact strength can be prepared by incorporating a multi-stage graft copolymer containing dienic rubber into aromatic polycarbonate resin. This is still not free from remarkable appearance of color shading or pearlessence on the molded articles.

On the other hand, in JPB S61(1986)-9982, it is disclosed that the impact strength of polycarbonate resin can be improved without losing its transparency by incorporating a multi-layered polymer consisting of a polymer of the first layer prepared by polymerization of an aromatic vinyl monomer, a polymer of the second layer prepared by polymerization of an alkyl acrylate monomer whose alkyl group has 1 to 8 carbon atoms and a third layer polymer, whose glass transition temperature is not lower than 50° C., prepared by polymerization of an aromatic vinyl monomer, into the polycarbonate resin together with a homopolymer or copolymer of an aromatic vinyl monomer.

According to this method, the transparency of the resulting resin composition is indeed not lost, but the object of this method is clearly different from that aiming at preventing a resin composition from appearance of color shading. Besides, in the impact strength, no reference is made to thickness dependence or impact strength at low temperature, and the result of improvement in impact strength is far from being satisfactory.

And, for overcoming such drawbacks observed in polycarbonate resin as less satisfactory moldability and chemical resistance, various proposals have been made. For example, in JPB S36(1961)-14035, an improvement of aromatic polycarbonate resin in its chemical resistance by incorporating polyethylene terephthalate resin thereinto is proposed. Also, in JPA S48(1973)-54160, an improvement of aromatic polycarbonate resin in its surface hardness and chemical resistance by incorporating polybutylene terephthalate resin thereinto is proposed. But, in these resin compositions, impact strength is not satisfactory.

Furthermore, in JPB S55(1980)-9435, a method of improving aromatic polycarbonate in its impact strength by incorporation of aromatic polyester and butadienic elastomer, and, in JPB S62(1987)-37671, a method of improving aromatic polycarbonate resin in its impact strength by incorporation of polyester resin and acrylic elastomer, are respectively proposed. According to these methods, impact strength is indeed improved, but, on colored molded articles, color shading or pearlessence appears, and, especially at the site where the resin composition receives a high shear rate in the process of molding, these phenomena are conspicuous. And, at the site where the resin composition receives a high shear rate in the process of molding, delamination is often observed, resulting sometimes in providing molded articles which cannot be put to practical use.

For solving such problems as involved in color shading possibly caused in the production of colored articles, in JPB H1(1989)-34463, there is proposed incorporation of a multi-layered polymer consisting of a first layer polymer prepared by polymerization of a styrenic monomer, a second layer polymer prepared by polymerization of an alkylacrylate monomer whose alkyl group has 1 to 8 carbon atoms and a third layer polymer prepared by polymerization of an alkylmethacrylate monomer whose alkyl group has 1 to 8 carbon atoms into a mixture of colored polycarbonate resin and polyester resin. However, even by this method, the problem of color shading is not solved sufficiently, and the impact strength of the resultant product at low temperatures is not satisfactory.

On the other hand, polyester resin is excellent in chemical resistance, thermal resistance, weatherability and moldability, but low in impact strength. For improving the impact strength, various proposals have been made so far. For example, in JPA S52(1977)-74652 and JPA H2(1990)-191614, a method of incorporating a core-shell elastomer containing epoxy group into polyester resin, and, in JPA S52(1977)-150466, a method of incorporating a core-shell elastomer containing no epoxy group into polyester resin. Even in colored molded articles prepared from these compositions, however, color shading or pearlessence is still observed, and the color appearance is still problematic.

SUMMARY OF THE INVENTION

The present invention was accomplished to solve various problems as mentioned above, and its object lies in providing a multi-layered polymer which is preferably incorporated, as impact modifier, into a thermoplastic resin containing polycarbonate resin and/or polyester resin, a thermoplastic resin composition containing polycarbonate resin and/or polyester resin together with the multi-layered polymer, which is excellent in mechanical properties including impact strength at low temperature, surface hardness and rigidity and also capable of providing molded articles free from color shading or pearlessness in the case of containing a coloring agent, and resin molded articles prepared by molding the resin composition.

More specifically, the present invention relates to a multi-layered polymer having (a) a core layer of an aromatic vinyl polymer, (b) an intermediate layer of a butadienic rubbery polymer and (c) an outer layer of an aromatic vinyl glassy polymer, the ratio of the components (a), (b) and (c) being 12 to 42 weight %, 48 to 78 weight % and 10 to 40 weight %), respectively, a thermoplastic composition containing polycarbonate resin and/or polyester resin together with the multi-layered polymer, and resin articles prepared by molding the thermoplastic resin composition.

DETAILED DESCRIPTION OF THE INVENTION

The multi-layered polymer of this invention can be obtained by a continuous multi-stage seed emulsion polymerization method in such a manner as coating a polymer of the previous stage with a polymer of the subsequent stage, successively.

The first stage polymerization, which provides said core-layer of the multi-layered polymer is carried out by using an aromatic vinyl monomer. This aromatic vinyl monomer includes, inter alia, styrene, vinyl toluene, α-methyl styrene, monochlorostyrene, 3,4-dichlrostyrene and bromostyrene. Among them, styrene is especially preferable.

In this first stage polymerization, a non-aromatic monomer can be used together with the above-mentioned aromatic vinyl monomer. The amount of the non-aromatic monomer is in a range of preferably 50 weight % or less, more preferably 20 weight % or less. Examples of such non-aromatic monomers include alkyl acrylate such as ethyl acrylate or butyl acrylate, alkyl methacrylate such as methyl methacrylate or butyl methacrylate, vinyl cyanide or vinylidene cyanide, such as acrylonitrile or methacrylonitrile, etc.

In the present invention, the core layer of the multi-layered polymer may be crosslinked with a crosslinking monomer. The amount of the crosslinking monomer to be employed is usually in the range of 30 weight % or less, preferably from 0.5 to 20 weight %, more preferably 5 to 15 weight %, relative to the total amount of the monomers employed in the first stage.

As such a crosslinking monomer as mentioned above, a monomer having two or more polymerizable ethylenic unsaturated bond in the molecule is preferably employed. Specific examples of the crosslinking monomer include aromatic divinyl monomer such as divinyl benzene, alkane polyol poly(meth)acrylate such as ethylene glycol di(meth)acrylate, butylene glycol di(meth)acrylate, hexane diol (meth)acrylate, oligoethylene glycol di(meth)acrylate, trimehylol propane di(meth)acrylate or trimethylol propane tri(meth)acrylate. Among these, divinyl benzene is especially preferable.

In the first stage polymerization, a grafting monomer can also be employed, and the amount is usually in the range of 5 weight % or less, preferably from 0.1 to 2 weight % relative to the total amount of the monomer employed in the first step. The grafting monomers are the monomers containing, in the molecule, two or more ethylenic unsaturated bonds whose reactivities are different from one another. Specific examples of the grafting monomer include allyl ester of unsaturated carboxylic acid, such as allyl(meth)acrylate, diallyl maleate, diallyl fumarate and diallyl itaconate. Among them, allyl methacrylate is especially preferable.

The second stage polymerization uses butadiene to form the intermediate layer of the multi-layered polymer.

And, in this second stage polymerization, beside butadiene, a vinyl monomer copolymerizable with butadiene can be employed. The amount of the vinyl monomer to be employed is preferably 90 weight % or less relative to the total amount of the monomers employed in the second stage polymerization. Since this intermediate layer is usually desired to have a glass transition temperature of −30° C. or below, preferable amount of the copolymerizable monomer to be employed varies with the kinds of the monomer. For example, alkyl acrylate such as ethyl acrylate, propyl acrylate, butyl acrylate, cyclohexyl acrylate or 2-ethylhexyl acrylate, can be used in an amount of 90 weight % or less, preferably 70 weight % or less, more preferably 50 weight % or less. And, alkyl methacrylate such as methyl methacrylate or butyl methacrylate, aromatic vinyl monomer such as styrene, vinyl toluene or alpha-methyl styrene, and vinyl cyanide monomer such as acrylonitrile, for example, are used preferably in an amount of 50 weight % or less, more preferably, 30 weight % or less.

The butadienic rubbery polymer forming the intermediate layer can be crosslinked with such a crosslinking monomer as mentioned above. Preferable examples of the crosslinking monomer include, especially, divinyl benzene, butylene glycol diacrylate and hexane diol diacrylate. Among them, divinyl benzene is preferably employed. The amount of the crosslinking monomer is usually in the range of from 0.01 to 5 weight %, preferably from 0.1 to 2 weight %, relative to the total amount of the monomers used for the second stage polymerization.

In the second stage polymerization, the grafting monomer described above can also be employed. Especially, allyl methacrylate is preferably employed. The amount of the grafting monomer to be employed is usually in a range of 5 weight % or less, preferably 0.1 to 2 weight %, relative to the total amount of the monomers used in the second stage polymerization.

The third stage polymerization for forming the outer layer is conducted, employing an aromatic vinyl monomer as the constituent, by allowing the rigid polymer, whose glass transition temperature is 50° C. or higher, to coat the above-mentioned rubbery polymer. While examples of the above-mentioned aromatic vinyl monomer include styrene, vinyl toluene, α-methyl styrene, monochlorostyrene, 3,4-dichlorostyrene and bromostyrene, styrene is especially preferable.

In this third stage polymerization also, a non-aromatic monomer copolymerizable with the above-mentioned aromatic vinyl monomer can be employed. The amount of the non-aromatic monomer is preferably 45 weight % or less, more preferably 30 weight % or less, relative to the total amount of the monomers employed in the third stage polymerization. Examples of the non-aromatic monomer include alkyl acrylate such as ethyl acrylate or butyl acrylate, alkyl methacrylate such as methyl methacrylate or butyl methacrylate, vinyl cyanide or vinylidene cyanide such as acrylonitrile or methacrylonitrile.

Further, the outer layer formed by the third stage polymerization may also be crosslinked with such crosslinking monomers as mentioned above. The amount of the crosslinking monomer is usually 30 weight % or less, preferably in the range of 0.5 to 20 weight %, relative to the total amount of the monomers employed in the third stage polymerization. As the crosslinking agent, divinyl benzene or butylene glycol dimethacrylate may be preferably used, and divinyl benzene is most preferable.

According to the present invention, as the rigid outer layer as described above, that principally consisting of a styrene-acrylonitrile copolymer is especially preferable.

To state further, in the present invention, a rigid intermediate layer can be introduced between the intermediate layer consisting of the above-mentioned rubbery polymer and the above-mentioned rigid outer layer. This rigid intermediate layer consists of a rigid polymer whose glass transition temperature is 50° C. or higher, preferably being formed by 1-5C alkyl methacrylate, for example, methyl methacrylate or butyl methacrylate.

This rigid intermediate layer may also be crosslinked with the crosslinking monomer described above. Preferable examples of the crosslinking monomer include divinyl benzene or butylene glycol dimethacrylate, the former being especially preferable. The amount of such crosslinking monomers as above is usually 30 weight % or less relative to the total amount of the monomers used for the formation of the rigid intermediate, preferably in the range of 0.5 to 20 weight %, especially preferably 5 to 15 weight %.

And, in the formation of the rigid intermediate layer, the above-described grafting monomer can be combinedly used. The amount of the grafting monomer is usually 5 weight % or less relative to the total amount of the monomers used for the formation of the rigid intermediate layer, preferably in the range of 0.1 to 2 weight %.

In a conventional multi-layered polymer, when it is incorporated into a thermoplastic resin composition, even in the case where the respective layers are crosslinked to prevent the lowering of the impact resistance of the resin, the crosslinkage is performed with a very small amount of crosslinking monomers. On the other hand, according to the present invention, as described above, the core layer, the rigid intermediate layer and/or the outer layer are preferably crosslinked respectively with 5 to 15 weight % crosslinking monomers relative to the total amount of the monomers used for forming the respective layers.

In the multi-layered polymer of the present invention, the core layer, the rigid intermediate layer and/or the outer layer are thus crosslinked with a large amount of crosslinking monomers. According to the present invention, by incorporating such a multi-layered polymer as above into polycarbonate resin, polyester resin or a mixture of them, a resin composition having excellent impact strength and improved in preventing color shading can be provided.

However, the total amount of the crosslinking monomers to be used in the core layer, the rigid intermediate layer and the outer layer is preferably in the range of 1 to 30 weight % relative to the total amount of the monomers used for the formation of the core layer, the rigid intermediate layer and the outer layer, especially in the range of 3 to 20 weight %.

The multi-layered polymer of this invention can be provided by the method, which comprises preparing latex by a conventional seed emulsion polymerization, subjecting the latex to freezing-thawing or salting-out to separate the polymer, then taking out the polymer as granules, flakes or powder by subjecting the polymer to centrifugal dehydration and to drying. And, the polymer can be taken out directly from the latex by subjecting the latex to spray-drying by means of a spray dryer. Thus-obtained multi-layered polymer can be used as it is, but, upon necessity, it can be further processed into pellets with an extruder and a pelletizer.

According to the present invention, the amount of toluene-soluble portion of the multi-layered polymer is preferably 10 weight % or less, especially 6 weight % or less. A resin composition prepared by incorporating the multi-layered polymer into polycarbonate resin, polyester resin or a mixture of them provides, when the resin composition is a colored one, a molded article improved in respect of appearance of color shading. The toluene-soluble portion is defined as percentage of the multi-layered polymer dissolved in toluene, when the multi-layered polymer is dispersed in 100 times by weight of toluene and the dispersion is left standing for 48 hours at room temperature.

Further, the multi-layered polymer of this invention is preferably of 100 to 700 nm, preferably 200 to 500 nm weight-average particle diameter so that the resulting resin composition may have satisfactory impact strength.

In the present invention, the multi-layered polymer consists of 12 to 42 weight % of the core layer, 48 to 78 weight % of the rubbery intermediate layer and 10 to 40 weight % of the outer layer, preferably of 15 to 30 weight % of the core layer, 50 to 65 weight % of the rubbery intermediate layer and 15 to 25 weight % of the outer layer.

As mentioned in the foregoing, the multi-layered polymer may have a rigid intermediate layer. This rigid intermediate layer is contained so that the total amount of the rigid intermediate layer and the outer layer occupies 10 to 40 weight %, preferably 15 to 25 weight % of the total amount of the multi-layered polymer. And, the rigid intermediate layer is contained in a range of 100 weight parts or less relative to 100 weight parts of the outer layer.

The total of the core layer, rubbery intermediate layer, rigid intermediate layer and outer layer is 100 weight %.

Following is the description of the thermoplastic resin composition prepared in accordance with the present invention.

The polycarbonate resin used in the present invention is commonly utilized for engineering plastic. Among them, preferred is an optionally branched thermoplastic polycarbonate resin which is produced by reacting an aromatic dihydroxyl compound as such or a mixture thereof with a small proportion of a polyhydroxyl compound with phosgene or a carbonic diester.

Examples of the aromatic dihydroxyl compound include 2,2-bis(4-hydroxyphenyl)propane (what is called bisphenol A), tetramethyl bisphenol A, tetrabromo bisphenol A, bis(4-hydroxyphenyl)-p-diisopropylbenzene, hydroquinone, resorcinol and 4,4-dihydroxydiphenyl.

And, the branched aromatic polycarbonate resin can be obtained by substituting a polyhydroxyl compound, e.g. phloroglucin, 4,6-dimethyl-2,4,6-tri(4-hydroxyphenyl)heptene-2,4,6-dimethyl-2,4,6-tri(4-hydroxyphenyl)heptane, 2,6-dimethyl-2,4,6-tri(4-hydroxyphenyl)heptene-3, 1,3,5-tri(4-hydroxyphenyl)benzene or 1,1,1-tri(4-hydroxyphenyl)ethane, or 3,3-bis(4-hydroxyaryl)oxyindole (sometimes called isatin bisphenol), 5-chloro isatin, 5,7-dichloro isatin or 5-bromo isatin with a portion, for example about 0.1 to 2 mol. %, of the above-mentioned dihydroxyl compound.

To state further, for adjusting the molecular weight of the polycarbonate resin to be obtained, a monovalent aromatic hydroxyl compound can be used. Examples of the monovalent hydroxyl compound include m- or p-methylphenol, m- or p-propylphenol, p-bromophenol, p-tert-butylphenol and p-long-chain alkyl substituted phenol.

Typical examples of the polycarbonate resin to be employed in the present invention include bis-(4-hydroxyphenyl)alkane series dihydroxyl compounds, especially polycarbonate resin having bisphenol A as the principal material. It is also possible to use polycarbonate copolymers obtained by using two or more aromatic dihydroxyl compounds or branched polycarbonate resin obtained by using a small amount of trivalent phenolic compound. Further, in the present invention, a mixture of these polycarbonate resins can also be used.

And, the polyester resin used in the present invention can also be one that is generally known as engineering plastics. Among them, polyalkylene terephthalate obtained by polycondensation of terephthalic acid or its dialkyl ester with aliphatic glycols or copolymer principally consisting of the polyalkylene terephthalate. Preferable examples of these polyester resins include polyethylene terephthalate (PET) or polybutylene terephthalate (PBT).

Examples of the above-mentioned aliphatic glycol include ethylene glycol, propylene glycol, tetramethylene glycol and hexamethylene glycol. These aliphatic glycols can be used in combination with other diols or polyhydric alcohols, for example, cyclohexane diol, cyclohexane dimethanol, xylylene glycol, 2,2-bis(4-hydroxyphenyl)propane, glycerin and pentaerythritol. The amount of these diols or polyhydric alcohols to be used is preferably 40 weight parts or less relative to 100 weight parts of aliphatic glycol.

For the production of polyester resin, terephthalic acid or its alkyl ester can be used in combination with di- or tribasic acid, for example, phthalic acid, naphthalene dicarboxylic acid, diphenyl dicarboxylic acid, adipic acid, sebasic acid, trimellitic acid or dialkyl esters of them, or their dialkyl esters, in an amount of, preferably 40 weight parts or less relative to 100 weight parts of terephthalic acid or its dialkyl ester.

The thermoplastic resin composition of this invention contains 0.5 to 50 weight parts, preferably 1 to 25 weight parts of the above-described multi-layered polymer relative to 100 weight parts of a thermoplastic resin composition consisting of 0 to 100 weight parts of polycarbonate resin and 100 to 0 weight parts of polyester resin. The ratio of the polycarbonate resin to the polyester resin can be appropriately selected within the above-mentioned range. For instance, when importance is attached to the properties of polycarbonate resin, the amount of polyester resin is preferably in the range of 0 to 50 weight % relative to 100 to 50 weight % of polycarbonate resin, while, when importance is attached to the properties of polyester resin, the amount of polyester is preferably in the range of 100 to 50 weight % relative to 0 to 50 weight % of polycarbonate resin.

In the thermoplastic resin composition of this invention containing a thermoplastic resin mixture consisting of 50 to 95 weight %, preferably 60 to 95 weight % of polycarbonate and 50 to 5 weight %, preferably 40 to 5 weight % of polyester resin, polyester resin is dispersed in the continuous matrix consisting of polycarbonate, and, in the case of a multi-layered polymer, it is dispersed substantially in the phase of this polyester resin. This is most apparent in the resin composition in which polybutylene terephthalate resin is used as polyester resin.

The thermoplastic resin composition of this invention can be obtained by blending polycarbonate resin and/or polyester resin with a multi-layered polymer in the above-mentioned ratio. The blending method and means are not specifically restricted, but "melt blend" is preferably employed. This "melt blend" is usually conducted at temperatures ranging from 200° to 300° C., using a heat-roll, a Banbury mixer or a single- or twin-screw extruder.

And, the thermoplastic resin composition of this invention may contain various additives in appropriate amounts, respectively. For example, stabilizers, pigments, flame-retardant, lubricants, inorganic fillers, antistatic agents, mold lubricants and ultraviolet light absorbers and so on may be incorporated. Addition of an anti-oxidant as the stabilizer is especially important, and a hindered phenol type anti-oxidant, a sulfuric anti-oxidant or a phosphoric anti-oxidant can be added singly or in admixture of them. Referring to pigments, various ones including dyes or pigments such as titanium-, azo- or phthalocyan-type ones, and carbon black, among others may be employed. These pigments are used in the range of usually from 0.01 to 20 weight parts relative to 100 weight parts of the resin composition.

The thermoplastic resin compositions described as above can be molded into molded articles of desired shape by subjecting to a conventional molding process such as injection molding, extrusion molding or compression molding. These molded articles can be used as automobile parts, e.g. bumper, fender and door handle, equipment or devices of so-called office automation or electrical equipment, for example.

The thermoplastic resin compositions of this invention retain excellent electrical and mechanical properties including dimensional stability intrinsic to polycarbonate resin and/or moldability and chemical resistance intrinsic to polyester resin, and, besides, are excellent in impact strength at low temperatures and remarkably improved in thickness-dependency of impact resistance.

And, in the case of colored articles prepared by molding a colored composition containing pigment, they are improved in respect of color shading pearlessence, and also in delamination around the gate region in the process of molding.

EXAMPLES

For a more complete understanding of the instant invention, reference is made to the following working examples and comparative examples, although it should be clearly understood that the invention is not limited thereto. In the working examples and comparative examples, "parts" means parts by weight, and the following abbreviations are used.

| | |
|---|---|
| Butadiene | Bd |
| Ethyl acrylate | EA |
| Butyl acrylate | BA |
| 2-Ethylhexyl acrylate | 2EHA |
| Methyl methacrylate | MMA |
| Styrene | St |
| Acrylonitrile | AN |
| Allyl methacrylate | AlMA |
| 1,4-Butylene glycol diacrylate | BGA |
| Divinyl benzene | DVB |
| Deionized water | DIW |
| Dioctylsulfosuccinate sodium salt | SSS |
| Pellex SS-L [Kao (KK)] (sodium alkyldiphenylether disulfonate) | SSL |
| Adekastab AO-80 [Asahi Denka Kogyo KK] (hindered phenolic anti-oxidant) | AO-80 |
| Adekastab AO-412S [Asahi Denka Kogyo KK] (thioether type anti-oxidant) | AO-412S |
| Adekastab 260 [Asahi Denka Kogyo KK] (phosphite type anti-oxidant) | 260 |
| Sodium persulfate | SPS |
| Sodium hydrogencarbonate | SHC |
| Polycarbonate | PC |
| Polybutylene terephthalate | PBT |

Incidentally, the weight-average particle diameter of multi-layered polymer was determined by means of a laser particle diameter analytical system LPA-3000 manufactured by Ohtsuka Denshi KK.

Example 1: (Production of Multi-Layered Polymer A)

A 2 liter polymerization reaction vessel equipped with a reflux condenser was charged with 930 g of DIW, 15 g of a 2% aqueous solution of SSL and 60 g of a 1% aqueous solution of SHC. The mixture was heated up to 70° C. while stirring in nitrogen streams, to which was added 15 g of MMA, allowing the latter to be dispersed in the course of 10 minutes. To the dispersion was added 75 g of a 2% aqueous solution of SPS to initiate seed polymerization.

| First-stage Monomer Emulsion | |
|---|---|
| St | 388.5 g |
| DVB | 45.0 g |
| AlMA | 1.5 g |
| 2% aqueous solution of SSL | 360.0 g |
| 1% aqueous solution of SHC | 30.0 g |

The mixture was heated up to 75° C., which was then fed continuously with 825 g of the first-stage monomer emulsion in the course of 90 minutes. The mixture was subjected to aging at 90° C. for one hour, which was cooled to 70° C. and was transferred into a 5 liter autoclave, followed by subjecting to the second-stage polymerization. To the reaction mixture was added 60 g of a 2% aqueous solution of SPS, which was fed with 1425 g of the second-stage monomer emulsion of the following composition, followed by aging at 70° C. for 16 hours.

| Second-stage Monomer Emulsion | |
|---|---|
| Bd | 322.7 g |
| 2EHA | 484.3 g |
| DVB | 15.0 g |
| AlMA | 3.0 g |
| 2% aqueous solution of SSL | 450.0 g |

| -continued | |
|---|---|
| Second-stage Monomer Emulsion | |
| 1% aqueous solution of HCl | 60.0 g |
| DIW | 90.0 g |

Further, the third-stage polymerization was conducted at 75° C. To the reaction mixture was added 30 g of a 2% aqueous solution of SPS, which was fed with 375 g of the third-stage monomer emulsion of the following composition in the course of 60 minutes, followed by subjecting the mixture to aging at 90° C. for one hour.

| Third-stage Monomer Emulsion | |
|---|---|
| St | 157.5 g |
| AN | 52.5 g |
| DVB | 15.0 g |
| 2% aqueous solution of SSL | 75.0 g |
| 1% aqueous solution of SHC | 30.0 g |
| DIW | 45.0 g |

The mixture was cooled to room temperature, which was fed with an anti-oxidant in the form of emulsion having the composition as shown below, followed by stirring for 30 minutes. Finally, the mixture was subjected to filtration with a 300-mesh stainless steel screen to afford a core-shell polymer latex having a solid content of 39.9% and a weight-average particle diameter of 270 nm. This latex was subjected to freezing and thawing to cause coagulation, followed by washing with water, dehydration and drying to afford the multi-layered polymer A.

| Anti-oxidant Emulsion | |
|---|---|
| AO-80 | 4.5 g |
| AO-412S | 7.5 g |
| 260 | 3.8 g |
| 2% aqueous solution of SSL | 45.0 g |
| toluene | 45.0 g |

Examples 2 to 4 (Production of Multi-Layered Polymers B to D)

With the composition shown in (Table 1), emulsion polymerization was conducted in substantially the same manner as in Example 1 to give a latex. The latex was subjected to freezing and thawing, washing with water, dehydration and drying to afford the multi-layered polymers B to D.

Comparative Example 1: (Production of Multi-Layered Polymer E)

A 2 liter polymerization reaction vessel was charged with 600 g of DIW, 20 g of 1% aqueous solution of SSS and 40 g of a 1% aqueous solution of SHC. The mixture was heated up to 70° C. while stirring, to which was added 40 g of EA to have it dispersed taking 10 minutes, followed by adding 80 g of a 2% aqueous solution of SPS to allow the seed polymerization to initiate.

| First stage monomer emulsion | |
|---|---|
| 2EHA | 752.0 g |
| BGA | 1.6 g |
| AlMA | 6.4 g |
| 2% aqueous solution of SSS | 280.0 g |

-continued

| First stage monomer emulsion | |
|---|---|
| 1% aqueous solution of SHC | 40.0 g |

The reaction mixture was, subsequently, subjected to continuous feeding with 1,080 g of the first-stage monomer emulsion in the course of 180 minutes. The resultant mixture was heated up to 90° C., which was aged for one hour. Thus-aged material was cooled to 70° C., followed by allowing the second stage polymerization to initiate. To the reaction mixture was added 20 g of a 2% aqueous solution of SPS, which was then fed with 360 g of the second stage monomer emulsion having the following composition in the course of 45 minutes. The resultant mixture was heated up to 90° C., followed by aging for 60 minutes at the same temperature.

| Second stage monomer emulsion | |
|---|---|
| MMA | 180 g |
| EA | 20 g |
| 1% aqueous solution of SSS | 60 g |
| 1% aqueous solution of SHC | 20 g |
| DIW | 80 g |

The reaction mixture was cooled to room temperature, which was subjected to filtration with a 300-mesh stainless steel screen to give a core-shell polymer latex having a solid content of 44.7% and a weight-average particle diameter of 293 nm. This latex was subjected to freezing and thawing to cause coagulation, followed by washing with water, dehydration and drying to yield the multi-layered polymer E.

Comparative Example 2: (Production of Multi-Layered Polymer F)

A 2 liter polymerization reaction vessel with a reflux condenser was charged with 1158 g of DIW, 16 g of 2% aqueous solution of SSL and 80 g of a 1% aqueous solution of SHC. The mixture was heated up to 70° C. while stirring in nitrogen streams, to which was added 80 g of EA. to have it dispersed taking 10 minutes, followed by adding 160 g of a 2% aqueous solution of SPS to allow the seed polymerization to initiate.

| First stage monomer emulsion | |
|---|---|
| Bd | 640.0 g |
| 2EHA | 876.0 g |
| BGA | 2.0 g |
| AlMA | 2.0 g |
| 2% aqueous solution of SSL | 160.0 g |
| 1% aqueous solution of SHC | 60.0 g |
| DIW | 600.0 g |

After 30 minutes, the reaction mixture was transferred into a 5 liter autoclave and was subsequently, subjected to continuous feeding with 2,340 g of the first-stage monomer emulsion in the course of 8 hours. The resultant mixture was aged at the same temperature for 16 hours, followed by allowing the second stage polymerization to initiate. To the reaction mixture was added 40 g of a 2% aqueous solution of SPS, which was then fed with 600 g of the second stage monomer emulsion having the following composition in the course of 60 minutes. The resultant mixture was aged at the same temperature for 60 minutes.

| Second stage monomer emulsion | |
|---|---|
| MMA | 360 g |
| EA | 40 g |
| 2% aqueous solution of SSL | 40 g |
| 1% aqueous solution of SHC | 40 g |
| DIW | 120 g |

The reaction mixture was cooled to room temperature, which was fed with an anti-oxidant in the form of emulsion having the composition as shown below in the course of 30 minutes, followed by stirring for 30 minutes. The reaction mixture was subjected to filtration with a 300-mesh stainless steel screen to give a core-shell polymer latex having a solid content of 43.8% and a weight-average particle diameter of 294 nm. This latex was subjected to freezing and thawing to cause coagulation, followed by washing with water, dehydration and drying to yield the multi-layered polymer F.

| Anti-oxidant Emulsion | |
|---|---|
| AO-80 | 6.0 g |
| AO-412S | 10.0 g |
| 260 | 5.1 g |
| 2% aqueous solution of SSL | 60.0 g |
| toluene | 60.0 g |

TABLE 1

| Multi-layered polymer | Ex. 1 A | Ex. 2 B | Ex. 3 C | Ex. 4 D | Com. Ex. 1 E | Com. Ex. 2 F |
|---|---|---|---|---|---|---|
| Multi-layer composition (weight ratio) | | | | | | |
| Core-layer | 30 | 30 | 30 | 30 | 80 | 80 |
| Rubbery intermediate layer | 55 | 55 | 55 | 55 | | |
| Outer layer | 15 | 15 | 15 | 15 | 20 | 20 |
| Core-layer composition (weight ratio) | | | | | | |
| ST | 86.4 | 86.4 | 86.4 | 86.4 | | |
| MMA | 3.3 | 3.3 | 3.3 | 3.3 | | |
| 2EHA | | | | | 94.0 | 54.75 |
| EA | | | | | 5.0 | 5.0 |
| Bd | | | | | | 40.0 |
| DVB | 10.0 | 10.0 | 10.0 | 10.0 | | |
| BGA | | | | | 0.2 | 0.125 |
| AlMA | 0.3 | 0.3 | 0.3 | 0.3 | 0.8 | 0.125 |
| Rubbery intermediate layer composition (weight ratio) | | | | | | |
| Bd | 39.1 | 58.7 | 39.1 | 58.7 | | |
| BA | | | 58.7 | 39.1 | | |
| 2EHA | 58.7 | 39.1 | | | | |
| DVB | 1.8 | 1.8 | 1.8 | 1.8 | | |
| AlMA | 0.4 | 0.4 | 0.4 | 0.4 | | |
| Outer layer composition (weight ratio) | | | | | | |
| St | 70.0 | 70.0 | 70.0 | 70.0 | | |
| AN | 23.3 | 23.3 | 23.3 | 23.3 | | |
| MMA | | | | | 90.0 | 90.0 |
| EA | | | | | 10.0 | 10.0 |
| DVB | 6.7 | 6.7 | 6.7 | 6.7 | | |
| Weight-average particle diameter | 270 | 272 | 266 | 262 | 293 | 294 |

TABLE 1-continued

| Multi-layered polymer (nm) | Ex. 1 A | Ex. 2 B | Ex. 3 C | Ex. 4 D | Com. Ex. 1 E | Com. Ex. 2 F |
|---|---|---|---|---|---|---|

Example 5: (Production of Thermoplastic Resin Composition (1))

To a mixture of 66.5 parts of polycarbonate resin prepared from bisphenol A (Iupilon E-2000 manufactured by Mitsubishi Gas Chemical Company Inc., hereinafter abbreviated as E-2000), 28.5 parts of poly(1,4-butylene terephthalate) (N-1100 manufactured by Mitsubishi Rayon Co., Ltd., hereinafter abbreviated as N-1100) and 5 parts of the multi-layered polymer A was added 1.39 parts of carbon black. The resultant mixture was subjected to melt-blending by the use of a 40 mm single screw extruder at cylinder temperatures of 240° to 260° C. to yield pellets of the resin composition (1).

Examples 6 to 8: (Production of Thermoplastic Resin Composition (2) to (4))

In substantially the same manner as Example 1, excepting the use of the multi-layered polymers B to D instead of the multi-layered polymer A, pellets of the resin compositions (2) to (4) were obtained.

Comparative Examples 3 and 4: (Production of Thermoplastic Resin Compositions (5) and (6))

In substantially the same manner as Example 1, excepting the use of the multi-layered polymers E and F instead of the multi-layered polymer A, pellets of the resin compositions (5) and (6) were obtained.

Comparative Example 5: (Production of Thermoplastic Resin Composition (7))

To a mixture of 70 parts of polycarbonate resin (E-2000) and 30 parts of poly(1,4-butylene terephthalate) (N-1100) was added 1.39 parts of carbon black. The resultant mixture was subjected to melt-blending by the use of a 40 mm single screw extruder at cylinder temperature of 240° to 260° C. to yield pellets of the resin composition (7).

Test Example 1: (Impact Strength Test)

Resin compositions (1) to (7) were respectively dried at 110° C. for at least 6 hours, and then injection-molded at 240° to 260° C. to prepare test specimens for testing their physical properties. Each specimen was notched by machining to give a 3.2 mm-thick test piece for Izod impact test, as directed in JIS K7110. The Izod impact strength was measured with these test pieces at 23° C., 0° C. and −30° C. in accordance with JIS K7100. And, delamination around the gate region was judged with eyes. The results are shown in Table 2.

Test Example 2: (Determination of L value and ΔE value)

Resin compositions (1) to (7) were respectively dried at 110° C. for at least 6 hours, and then injection-molded at 240° to 260° C. to prepare test specimens, each of which has portions of three different thickness, i.e. 2 mm, 3 mm and 4 mm. Each test specimen was subjected to determination of L value at the portion of 4 mm thickness and to measurement of color difference (ΔE value) in the portion of 2 mm portion and 4 mm portion by using an SM Color Computer (manufactured by Suga Test Machine KK). The results are shown in Table 2. The L value expresses the density of color, and, as the value becomes smaller, the color becomes nearer to perfect black. And, ΔE value expresses the degree of color shading or pearlessence (color difference) between the 2 mm thick portion and 4 mm thick portion.

As ΔE value becomes larger, the mottlings between the two portions become larger. Therefore, for getting the resin compositions to be excellent in color stability, those having both L value and ΔE value as small as possible are preferable.

TABLE 2

| Thermoplastic resin Composition | Ex. 5 (1) | Ex. 6 (2) | Ex. 7 (3) | Ex. 8 (4) | C. Ex. 3 (5) | C. Ex. 4 (6) | C. Ex. 5 (7) |
|---|---|---|---|---|---|---|---|
| Composition ratio (weight parts) | | | | | | | |
| PC (E-2000) | 66.5 | 66.5 | 66.5 | 66.5 | 66.5 | 66.5 | 70.0 |
| PBT (N-11000) | 28.5 | 28.5 | 28.5 | 28.5 | 28.5 | 28.5 | 30.0 |
| Multi-layered polymer | | | | | | | |
| A | 5.0 | | | | | | |
| B | | 5.0 | | | | | |
| C | | | 5.0 | | | | |
| D | | | | 5.0 | | | |
| E | | | | | 5.0 | | |
| F | | | | | | 5.0 | |
| Carbon black | 1.39 | 1.39 | 1.39 | 1.39 | 1.39 | 1.39 | 1.39 |
| Izod Impact Strength (kgf. cm/cm$^2$) | | | | | | | |
| 23° C. | 81.3 | 87.2 | 82.6 | 86.7 | 80.4 | 81.3 | 9.0 |
| 0° C. | 75.3 | 82.0 | 73.7 | 82.4 | 78.8 | 79.9 | 8.0 |
| −30° C. | 22.7 | 31.2 | 20.4 | 27.8 | 24.1 | 24.5 | 8.0 |
| L value | 7.9 | 7.5 | 7.9 | 7.7 | 10.7 | 12.5 | 6.4 |
| Δ E value | 0.58 | 0.46 | 0.40 | 0.43 | 2.41 | 0.80 | 0.37 |
| Delamination around the gate [1] | O | O | O | O | X | Δ | O |

(Note)
[1]: O = good (no delamination),
Δ = formation of surface layer is observed,
X = delamination is observed on the surface As is apparent from (Table 1) and (Table 2), molded articles of the present invention are excellent over those of Comparative Examples in both impact strength and color stability.

What is claimed is:

1. A thermoplastic resin composition containing pigment and (1) thermoplastic resin mixture containing polycarbonate resin and polyester resin and (2) a three-layered polymer having (a) a core layer of an aromatic vinyl polymer, (b) an intermediate layer of a butadienic rubbery polymer and (c) an outer layer of an aromatic vinyl glassy polymer, the amount of the components (a), (b) and (c) being 12 to 42 weight %, 48 to 78 weight % and 10 to 40 weight %, respectively based on the weight of the three-layered polymer.

2. A thermoplastic resin composition as claimed in claim 1, wherein the intermediate layer (b) is a copolymer of (i) butadiene in the range of 39.1 to 60% by weight based on the weight of the intermediate layer with (ii) an alkyl acrylate monomer containing 2 to 8 carbon atoms in the alkyl moiety.

3. A thermoplastic resin composition as claimed in claim 1, wherein the amount of the components (a), (b) and (c) is 15 to 30 weight %, 50 to 65 weight % and 15 to 25 weight %, respectively.

4. A thermoplastic resin composition as claimed in claim 1, wherein the three-layered polymer has 100 to 700 nm weight-average particle diameter.

5. A thermoplastic resin composition as claimed in claim 1, wherein the three-layered polymer is present in the composition in an amount of 0.5 to 50 parts by weight per 100 parts by weight of the thermoplastic resin mixture.

6. A thermoplastic resin composition as claimed in claim 1 wherein the core layer (a), the intermediate layer (b) and the outer layer (c) are respectively crosslinked with a crosslinking monomer.

7. A thermoplastic resin composition as claimed in claim 1, wherein the core layer (a), the intermediate layer (b) and the outer layer (c) are respectively grafted with a grafting monomer.

8. A thermoplastic resin composition as claimed in claim 1, which contains 50 to 95 weight % of polycarbonate and 50 to 5 weight % of polyester resin.

9. A resin article prepared by molding a thermoplastic composition as defined in claim 1.

10. A method for the improvement of uniformity of color appearance by avoiding color shading in a molded resin article formed from a thermoplastic resin mixture containing pigments, polycarbonate resin and polyester resin which comprises incorporating into said resin mixture a multi-layered polymer having (a) a core layer of an aromatic vinyl polymer, (b) an intermediate layer of a butadienic rubbery polymer and (c) an outer layer of an aromatic vinyl glassy polymer, the amount of the components (a), (b) and (c) being 12 to 42 weight %, 48 to 78 weight % and 10 to 40 weight %, respectively based on the weight of the multi-layered polymer.

11. A method according to claim 10 wherein the thermoplastic resin mixture contains 50-95 weight % of polycarbonate and 50-5 weight % of polyester resin.

12. A method according to claim 10 wherein the multi-layered polymer is incorporated in an amount of 0.5 to 50 parts by weight per 100 parts by weight of the thermoplastic resin mixture.

* * * * *